United States Patent [19]

Kochem

[11] 4,071,875
[45] Jan. 31, 1978

[54] DETECTOR APPARATUS

[75] Inventor: Robert C. Kochem, Attleboro, Mass.

[73] Assignee: Texas Instruments Incorporated, Dallas, Tex.

[21] Appl. No.: 644,793

[22] Filed: Dec. 29, 1975
(Under 37 CFR 1.47)

[51] Int. Cl.² .............................................. H02H 7/08
[52] U.S. Cl. .................................... 361/113; 361/27; 361/106
[58] Field of Search ............... 317/53, 40 R, 41, 18 C, 317/27 R, 13 B, 13 C, 13 R, 132, 138, 147; 323/48, 57, 62, 76; 340/417, 419, 228 R, 253 D; 318/473, 474; 334/5

[56] References Cited

U.S. PATENT DOCUMENTS

| 2,394,786 | 2/1946 | Korneke | 317/53 X |
|---|---|---|---|
| 2,441,967 | 5/1948 | Haug | 323/76 X |
| 2,991,397 | 7/1961 | Place | 317/53 X |
| 3,072,827 | 1/1963 | Benish | 317/53 X |
| 3,210,607 | 10/1965 | Flanagan | 317/53 X |
| 3,358,208 | 12/1967 | Takami | 317/40 R X |
| 3,436,692 | 4/1969 | Walters | 323/48 X |
| 3,588,595 | 6/1971 | Silvers | 317/41 X |
| 3,946,279 | 3/1976 | Paice et al. | 317/18 C |

*Primary Examiner*—J D Miller
*Assistant Examiner*—Patrick R. Salce

*Attorney, Agent, or Firm*—John A. Haug; James P. McAndrews

[57] ABSTRACT

A circuit is shown useful to protect dynamoelectric machines from overtemperature conditions. The circuit comprises first and second tuned circuits coupled to the power lines of the dynamoelectric machine along with an oscillator for injecting a selected frequency signal in the line and a detector for detecting the signal when the tuned circuits are resonant. A thermally responsive switch comprising an electromechanical bimetal switch or a solid state PTC or NTC switch is adapted to be disposed in heat conductive relation with the dynamoelectric machine and is electrically coupled to one of the tuned circuits so that the temperatures below a selected level the switch will be in one state, e.g. a low impedance state, precluding resonance while at temperatures above the selected level the switch will be in an opposite state, e.g. a high impedance state, permitting resonance. A detector particularly useful for detecting the above-mentioned signal is shown to comprise a three legged E-I transformer core on one leg of which is disposed a shunt winding. The shunt winding is coupled to a frequency selective device such as a capacitor. A sensing winding is disposed on the center leg and a power supply line is trained through the core so that it forms two turns and causes opposing flux in the center leg of the transformer.

4 Claims, 7 Drawing Figures

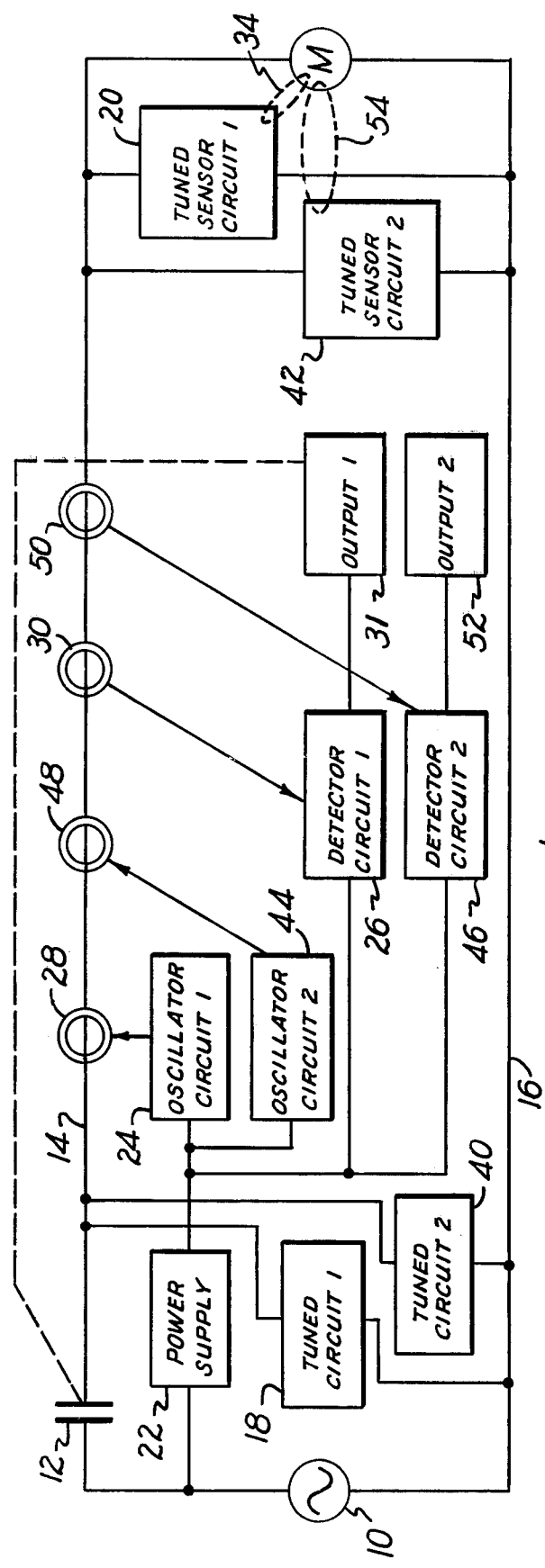
Fig. 5.
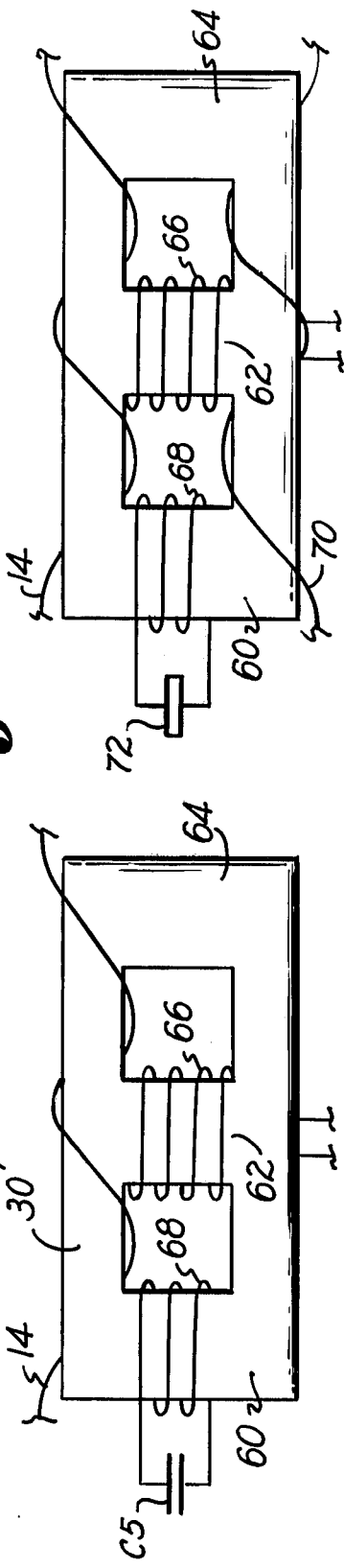
Fig. 7.
Fig. 6.

DETECTOR APPARATUS

This invention relates generally to the detection of electrical signals and more particularly the detection of small current signals impressed upon a carrier signal of larger amplitude and different frequency.

In copending application Ser. No. 644,794, filed Dec. 29, 1975 entitled "Motor Protector Circuit", a circuit is disclosed and claimed which employs a protector as a thermal sensor yet eliminates the need for lead lines extending from the sensor to the motor controller. The circuit includes first and second tuned branch circuits connected across a pair of power lines leading to the motor. An oscillator circuit is coupled to one of the power lines intermediate the first and second tuned circuits for impressing therein a signal having a selected frequency. A detector circuit is also coupled to one of the power lines intermediate the first and second tuned circuits for detecting this signal. A conventional power supply is used to energize the oscillator and detector circuits. The tuned circuits may comprise a serially connected inductance and capacitance and one of the tuned circuits includes a thermally responsive switch adapted to be mounted in thermal communication with a winding of the motor. This switch may be an electromechanical device such as a bimetallic switch, or a solid state PTC or NTC thermistor. The tuned circuit including the switch may be conveniently included in the motor terminal box. During normal operation the temperature of the motor is below a preselected level and the thermally responsive switch is in a first state causing an impedance level in the tuned circuit in which it is connected which precludes resonance; however, upon the occurrence of a fault condition in the motor which causes the temperature of the motor winding to increase above the preselected level, the heat is conducted to the thermally responsive switch causing it to change to a second state causing an impedance level in the tuned circuit in which it is connected which causes resonance. When resonance occurs the detector produces an output signal which may be used to deenergize the motor through a conventional controller or to provide an alarm indication as by energizing an alarm light.

Multiphase or multitemperature protection can be provided by employing additional oscillators for impressing a signal having frequencies different from the first mentioned signal. Separate detectors and tuned circuits would also be required for each additional frequency utilized.

However, one of the problems associated with most low cost magnetic means of detecting a high but small amplitude frequency impressed on a conventional 60HZ power line carrying significant current as employed in the aforementioned copending application is the tendency of the line current to saturate the core or to otherwise interfere with the detection of the signal.

It is an object of this invention to provide a detector device to detect such high frequency low amplitude signals impressed on another relatively low frequency signal which is not subject to the above-noted difficiencies. Another object is the provision of a reliable, low cost frequency detector, which includes a core that does not tend to become saturated by the carrier current.

These and other objects are achieved in the present invention by a three legged E-I transformer core on one leg of which is disposed a shunt winding electrically coupled to a frequency selective device such as a capacitor. A sense winding is disposed on the center leg and a power line is trained through the core so that it forms two turns. Flux of the carrier signal, e.g. 60HZ generated by the two turns are cancelled in the center leg while flux generated by high frequency injected by an oscillator by the first turn will be inhibited by the shunt winding leaving the sense winding to sense the high frequency flux generated by the second turn.

FIG. 5 is a schematic diagram of the motor protection circuit illustrating another embodiment thereof;

FIG. 6 is a schematic view of a detector useful in the FIGS. 1 and 5 circuits; and FIG. 7 is a view similar to FIG. 5 showing a detector as used with a multiphase system.

Figure 1:
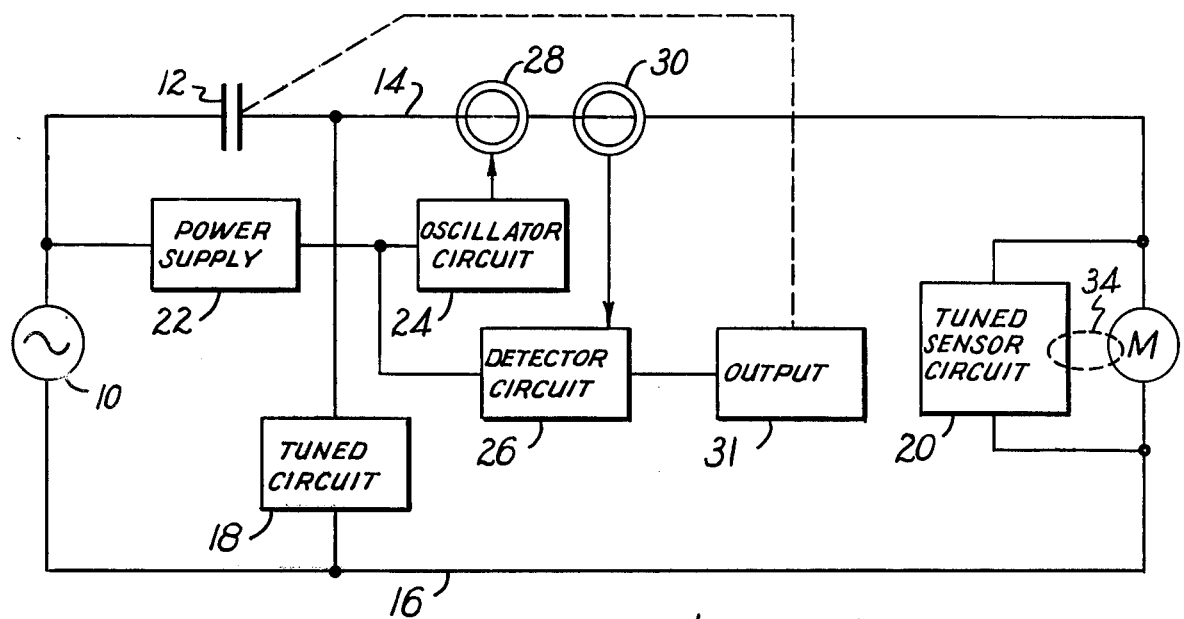
FIG. 1 is a schematic diagram of one embodiment of a motor protection circuit constructed according to the invention.

Referring now to the drawings, specifically FIG. 1, there is shown a motor protection circuit including an alternating current power supply 10, e.g. 240 volt, coupled through contactor 12 by power lines 14 and 16 to a motor M. A first tuned or reactive circuit 18 is connected across lines 14 and 16. Intermediate tuned circuit 18 and motor M a second tuned or reactive circuit 20 is connected across lines 14 and 16. A power supply 22 is connected to line 12 and provides a suitable low voltage supply, e.g. 24 volt, for a conventional oscillator circuit 24 and a detector circuit 26 to be discussed in further detail below. Oscillator circuit 24 is coupled to line 14 in a conventional manner as by inductively coupling through toroidal core 28 and in like manner detector circuit 26 is coupled to line 14 as by inductively coupling through toroidal core 30. Detector circuit 26 is provided with output means 31 which may be coupled to contactor 12 arranged to open the contactor upon occurrence of an output signal or to energize an alarm light (not shown) or other indicating means.

Figure 2:
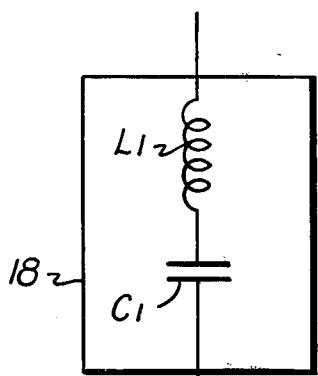
FIG. 2 is a schematic diagram showing the components of a tuned circuit employed in the FIG. 1 embodiment.
Figure 3:
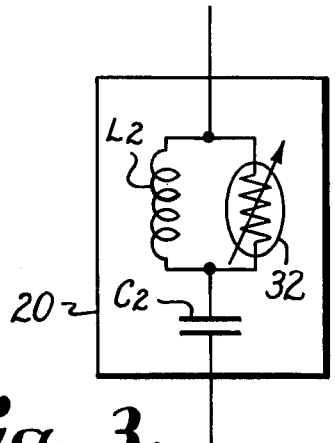
FIG. 3 is a schematic diagram showing the components of one form of a tuned sensing circuit employed in the FIG. 1 embodiment.

Tuned circuits 18 and 20 are adapted to resonate at a selected frequency which is produced by oscillator circuit 24. FIG. 2 shows tuned circuit 18 comprising serially connected inductance L1 and capacitance C1. Tuned circuit 20, identified in FIG. 3 of the drawings as a tuned sensor circuit, includes serially connected inductance L2 and capacitance C2 along with PTC thermistor 32 connected across inductance L2. This sensor circuit may be conveniently disposed in the motor terminal box. PTC thermistor 32 is adapted to be thermally coupled to the motor windings as by physically embedding the thermistor in a winding. Dashed line 34 in FIG. 1 schematically indicates the thermal coupling between the motor windings and the PTC thermistor 32. PTC thermistor 32 is preferably composed of material having a steeply sloped positive temperature coefficient of resistivity at temperatures above an anomaly or threshold temperature and a relatively low resistance at temperatures below the anomaly point. Such a thermistor may, for example, be composed of barium titanate doped with lanthanum and other rare earths.

By way of example, the AC power supply for motor M may be 60HZ. The oscillator is chosen so that the frequency of its signal is substantially higher than the 60HZ of the power supply, for example, 10KHZ.

During normal operation of motor M the temperature of its windings is relatively low and is below the anomaly point of thermistor 32. The impedance of thermistor 32 is therefore in a low state during normal operation shunting impedance L2 and precluding resonance in L2, C2. Should a fault condition in motor M occur which causes the temperature of the motor to increase and concomitantly causes the temperature of the thermistor 32 to increase above the anomaly point its impedance suddenly goes into a high state and L2, C2 will resonate with L1, C1 and in effect will form a shorted turn therewith.

The signal impressed through core 28 will then be detected through core 30 by detector circuit 26 causing an output which actuates contactor 12 to deenergize motor M.

Figure 4:
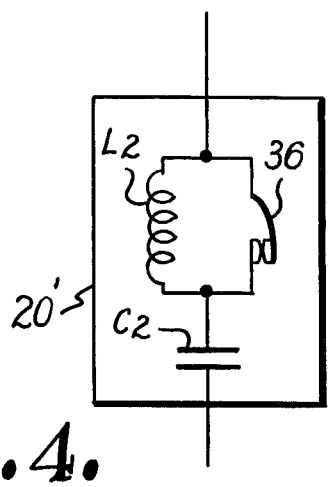
FIG. 4 is a schematic diagram showing the components of a second form of a tuned sensing circuit employed in the FIG. 1 embodiment.

FIG. 4 depicts a modified tuned sensor circuit in which an electromechanical thermostatic switch 36 comprising a bimetallic disc is used rather than PTC thermistor 32. Switch 36 is connected across inductance L2 in the same manner as thermistor 32 and also has a low impedance state (closed contacts), and a high impedance state (open contacts). The operation of the circuit is otherwise the same as described above.

If it is desired to provide indication of normal operation the PTC thermistor could be substituted by an NTC thermistor. During normal operation the impedance of the thermistor would be high allowing the tuned circuits to resonate. The detector would pick up the resonated signal and provide an output which could be used for example, to energize a lamp indicating that the motor was operating under normal conditions. Should the motor overheat the heat will be conducted to the NTC thermistor causing it to go into a low resistance state thereby precluding resonance in the tuned circuits and causing deenergization of the lamp.

FIG. 6 shows a detector which can be employed with detector circuit 26. A three legged E-I transformer core 30' is provided with legs 60, 62, 64. Sensing winding 66 is disposed on leg 62 while a shunt winding 68 is disposed on leg 60. A frequency selection device, capacitor C5 is serially connected to winding 68. Power line 14 is trained through core 30' forming a first turn between legs 60, 62 and a second turn between legs 62, 64.

The two turns of power line 14 generate opposing fluxes of 60HZ (or other carrier signal employed) in center leg 62 resulting in no net flux and no signal detected by sense winding 66. Capacitor C5, or other frequency selective device, causes the shunt winding 68 to inhibit any high frequency flux to be generated by the turn of power line 14 between legs 60 and 62 therefore there is no flux cancellation of high frequency in leg 62 of the flux generated by the turn of the power line between legs 62 and 64. The detector is therefore able to sense the high frequency signal impressed by oscillator circuit 24 when the signal is resonated without interference caused by the carrier signal.

The above detector is particularly effective in detecting small electrical current signals which have been impressed upon a carrier signal of larger amplitude and different frequency without having a tendency to become saturated by the carrier signal.

FIG. 5 shows the motor protection circuit employed to provide multicondition indication of a motor. A second tuned sytem including a second tuned branch circuit 40 and tuned sensor branch circuit 42 connected across lines 14 and 16 are selected to resonate at a second frequency produced by a second oscillator 44 which frequency is different from that produced by oscillator 24. Upon resonance the signal impressed through core 48 will be detected through core 50 by detector circuit 46 which will produce a signal at output 52. It will be understood that tuned circuit 42 includes a thermal switch (PTC thermistor 32 or bimetallic switch 36) thermally coupled (indicated by dashed lines 54) to the motor M. The switches would be selected to change from one state to the other at different temperatures, e.g. T1 and T2. The switches may be placed in heat conductive relationship with the same winding if desired and upon heating of the motor and hence the thermally responsive switches to temperature T1 a signal will be provided at output 52 which can be employed to energize an alarm light or some other indicator means. Upon further heating when the temperature T2 is reached the other thermally responsive switch will change state causing a signal at output 31 which can be employed to actuate contactor 12 to deenergize the motor as in the FIG. 1 embodiment.

Multiphase protection can be provided by employing switches selected to change from one state to the other at approximately the same temeprature and placing them in thermal communication with separate windings. Respective tuned circuit means and oscillators are then used with power lines leading to the respective windings.

FIG. 7 shows a detector useful in monitoring a three phase system. Two of the three power lines, 14 and 70 each form a turn between legs 60, 62 and 62, 64 of core 31'. In this case the frequency selection device 72 attached to shunt winding 68 would be selected to inhibit the high frequency impressed by the turn of both lines 14 and 70 between legs 60 and 62.

The sense winding will pick up the resonated high frequency signal impressed in either line 14 or 70 and cause appropriate indication of the sensed condition.

In the foregoing specification, the invention has been described with reference to specific exemplary embodiments thereof. However, it will be evident that various modifications and changes may be made thereunto without departing from the broader spirit and scope of the invention as set forth in the appended claims. The specification and drawings are, accordingly, to be regarded in an illustrative rather than in a restrictive sense.

I claim

1. Detection apparatus comprising a three legged E-I transformer core, a shunt winding disposed on the first leg, frequency selective means electrically coupled to the shunt winding, signal sensing means inductively coupled to the second leg and a carrier signal line trained through the core forming two turns, one turn disposed between the first and second legs and the second turn disposed between the second and third legs.

2. Detection apparatus according to claim 1 in which a second carrier signal line is trained through the core forming two turns, one turn of the second carrier signal line disposed between the first and second legs and the second turn of the second carrier signal line disposed between the second and third legs.

3. Detection apparatus according to claim 1 in which the frequency selection means is a capacitor.

4. Detection apparatus according to claim 3 in which the signal sensing means comprises a winding disposed on the second leg.

* * * * *